(12) United States Patent
Kuhn et al.

(10) Patent No.: US 8,584,439 B2
(45) Date of Patent: Nov. 19, 2013

(54) TINE PICKUP WITH NARROW TINE SPACING FOR A BALER

(75) Inventors: Allen J. Kuhn, Hesston, KS (US);
Patrick Kendrick, Hesston, KS (US);
Thomas G. Schrag, Hesston, KS (US);
Maynard M. Herron, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/434,173

(22) Filed: Mar. 29, 2012

(65) Prior Publication Data
US 2013/0167499 A1    Jul. 4, 2013

Related U.S. Application Data

(60) Provisional application No. 61/580,750, filed on Dec. 28, 2011.

(51) Int. Cl.
*A01D 43/02*    (2006.01)
*A01D 89/00*    (2006.01)

(52) U.S. Cl.
USPC .......................................................... 56/364

(58) Field of Classification Search
USPC ............... 56/364, 341, 400, 16.1; 172/42, 79, 172/620, 621, 622
See application file for complete search history.

(56) References Cited

U.S. PATENT DOCUMENTS

| | | | | |
|---|---|---|---|---|
| 2,881,580 A * | 4/1959 | Ashton | .......................... | 56/364 |
| 3,983,683 A | 10/1976 | James | | |
| 4,297,833 A * | 11/1981 | Gaeddert | ......................... | 56/364 |
| 5,042,243 A * | 8/1991 | Doering | ........................... | 56/400 |
| 5,052,171 A | 10/1991 | Bich et al. | | |
| 5,394,682 A | 3/1995 | Frimml et al. | | |
| 5,426,928 A | 6/1995 | Frimml et al. | | |
| 5,524,425 A * | 6/1996 | Gallazzini | ....................... | 56/364 |
| 6,237,695 B1 * | 5/2001 | Pierce et al. | ..................... | 172/79 |
| 6,314,709 B1 | 11/2001 | McClure | | |
| 6,327,840 B1 * | 12/2001 | Rumph | ............................ | 56/341 |
| 6,370,856 B1 | 4/2002 | Engel | | |
| 6,640,527 B2 * | 11/2003 | Farley et al. | .................... | 56/12.4 |
| 6,863,133 B2 * | 3/2005 | Graf | ................................ | 172/79 |
| 6,877,304 B1 | 4/2005 | Smith | | |
| 6,948,300 B1 * | 9/2005 | Bandstra et al. | ................. | 56/341 |
| 6,962,041 B1 | 11/2005 | Taylor et al. | | |
| 7,107,748 B2 | 9/2006 | McClure | | |
| 7,204,074 B2 * | 4/2007 | Bandstra et al. | ................. | 56/341 |
| 7,296,393 B1 * | 11/2007 | McClure et al. | .................. | 56/341 |
| 7,370,462 B2 * | 5/2008 | Kraus et al. | .................... | 56/341 |
| 7,617,662 B2 | 11/2009 | Erdmann et al. | | |
| 8,096,102 B2 * | 1/2012 | Smith | ............................. | 56/364 |
| 8,156,723 B1 * | 4/2012 | McClure et al. | .................. | 56/364 |
| 8,261,524 B1 * | 9/2012 | McClure et al. | .................. | 56/364 |
| 2005/0210855 A1 * | 9/2005 | Bandstra et al. | ................. | 56/341 |
| 2006/0283163 A1 * | 12/2006 | Kraus et al. | .................... | 56/16.8 |
| 2011/0088365 A1 * | 4/2011 | Smith | ............................. | 56/364 |

* cited by examiner

*Primary Examiner* — Árpád Fábián-Kovács

(57) ABSTRACT

A pickup assembly of an agricultural machine has a rotatable shaft and bulkheads with a reel assembly having plural double-stacked tine rows flanked by reel cover attachment areas. Each double-stacked tine row has a plurality of spaced apart tines with a pair of radially extending portions for engaging crop material. Each double-stacked tine row has a first row of tines and a second row of tines offset from the first row such that adjacent tines are offset in both a direction around the circumference of the shaft and also in a transverse direction along the shaft. A reel cover is coupled to the bulkhead and has slots through which portions of the tines extend.

7 Claims, 6 Drawing Sheets

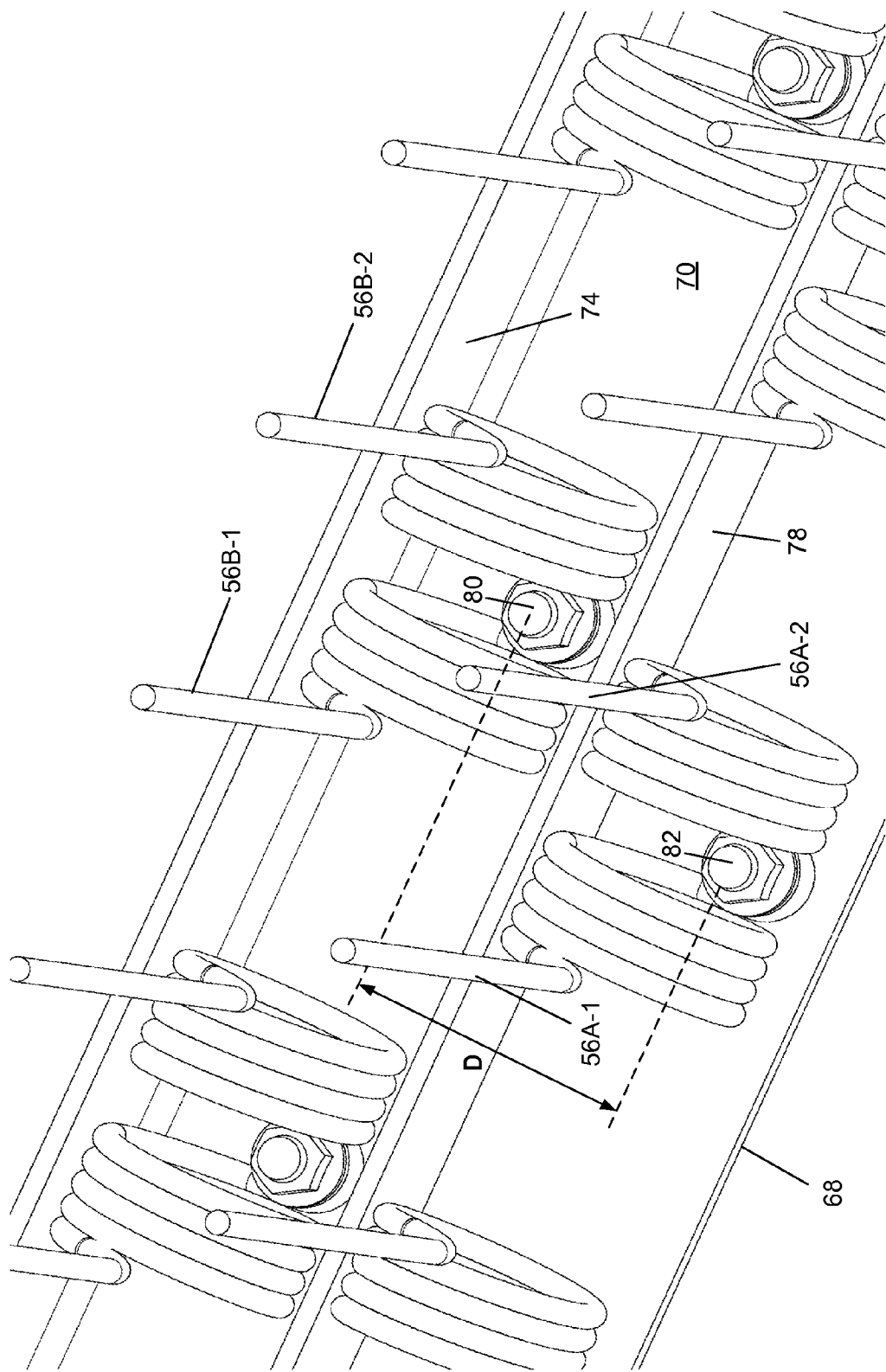

TINE PICKUP WITH NARROW TINE SPACING FOR A BALER

CROSS-REFERENCE TO RELATED APPLICATION

This application claims priority to copending U.S. provisional application entitled, "Tine Pickup With Narrow Tine Spacing For A Baler," having Ser. No. 61/580,750, filed Dec. 28, 2011, which is entirely incorporated herein by reference.

TECHNICAL FIELD

The present disclosure is generally related to agricultural machinery, and, more particularly, pickup assemblies for a baler.

BACKGROUND

Agricultural machinery, such as balers, have a pickup assembly with a row of tines to pick up biomass from the ground and transfer the biomass to bale forming machinery internal to the baler. For instance, conventional baler pickup assemblies have a row of tines on a rotating reel that is disposed across the pickup assembly, the pickup assembly in turn bolted to a structural member that has wrappers fitted between each of the tines to guide crop over the pickup assembly and into the baler. Coils on the tines, and a minimum manufacturable width for the wrappers, combine to create a minimum tine spacing.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6 is a schematic diagram illustrating a partial plan view of offset tine pairs of an embodiment of a reel assembly.

DESCRIPTION OF EXAMPLE EMBODIMENTS

Overview

Figure 1:
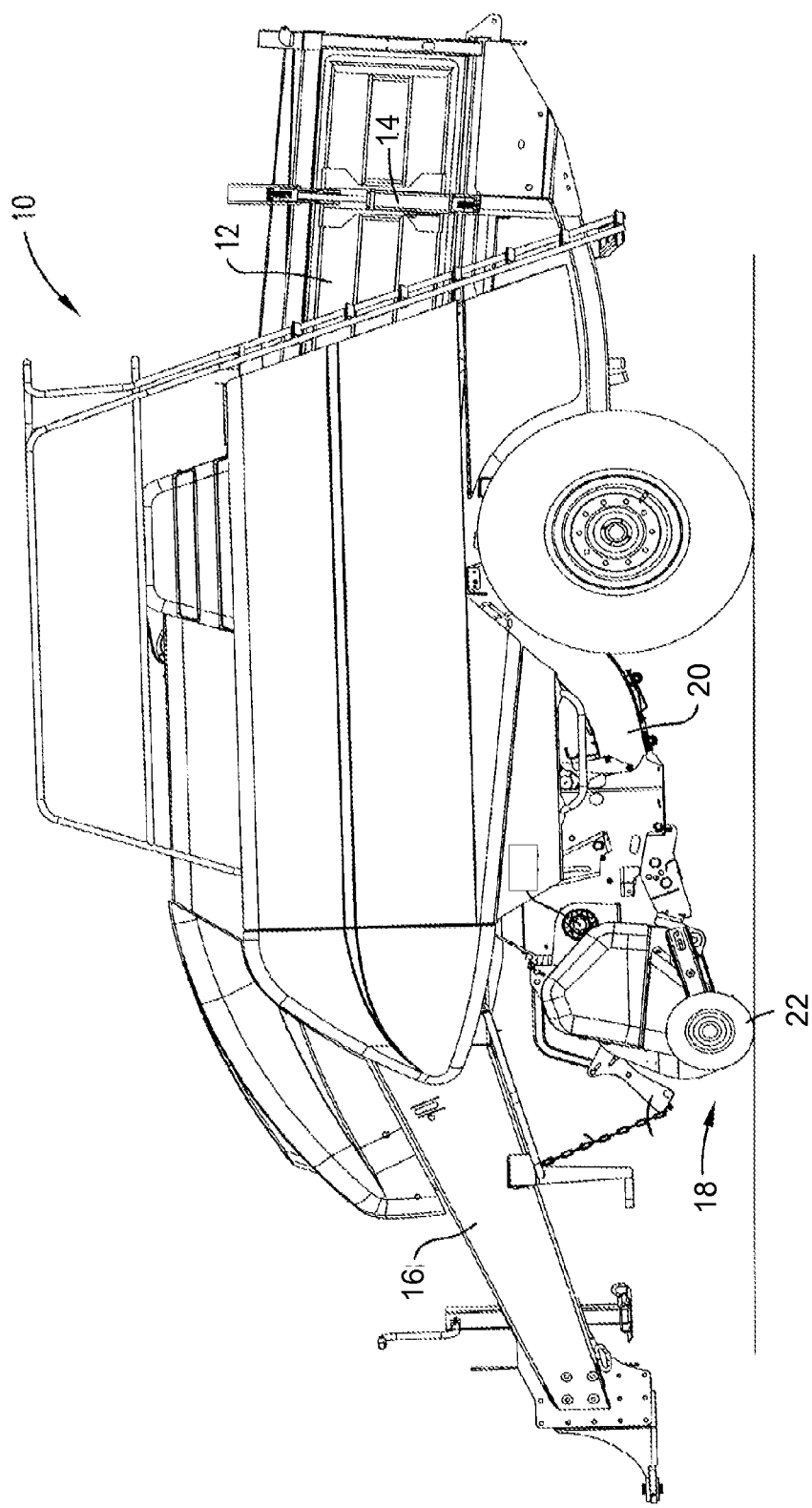
FIG. 1 is an example environment in which an embodiment of a pickup assembly may be used.

In one embodiment, a reel assembly for a pickup assembly of an agricultural machine, the reel assembly comprising: a rotatable bulkhead; plural rows of tines rotatable with the bulkhead; and a reel cover coupled to the bulkhead and comprising plural slots through which the tines extend.

Detailed Description

Certain embodiments of an invention comprising a pickup assembly and/or associated sub-assemblies are disclosed that enable an agricultural machine (e.g., baler or other crop material gathering machinery) to more efficiently gather crop material, such as biomass, especially short particle biomass (e.g., less than three (3) inches in length), off of the ground when compared to conventional baler pickup designs. One embodiment of a pickup assembly comprises a reel assembly having a double-stacked tine arrangement that comprises pairs of tines in respective tine rows, each row offset from the adjacent row, to enable narrower tine spacing. In some embodiments, the pickup assembly comprises a reel assembly having a reel cover that rotates coincident with a reel shaft and bulkhead arrangement. The reel cover comprises plural slots that enable each tine to extend beyond the surface of the reel cover while preventing or mitigating the deposit of crop material into the internal working mechanisms of the reel assembly.

In contrast to certain embodiments disclosed herein, conventional baler pickup assemblies have multiple, single rows of tines, each single row separated radially by a fixed gap of the reel. For instance, when viewed from a side elevation view, conventional (circular) reels may have a single tine row located at the 12:00 position of the reel, another single row of tines at the 3:00 position of the reel, and a respective single row of tines at the 6:00 and 9:00 positions of the reel. Gaps or spacing between the tines in a given row are occupied by a respective wrapper bolted to a structural member. The gaps between tines may result in a less efficient gathering of biomass or other crop material, particularly those of lengths less than three (3) inches.

Having summarized various features of certain embodiments of a pickup assembly of the present disclosure as compared to conventional assemblies, reference will now be made in detail to the description of the disclosure as illustrated in the drawings. While the disclosure is described in connection with these drawings, there is no intent to limit it to the embodiment or embodiments disclosed herein. For instance, though an agricultural machine embodied as a square baler towed by another vehicle (e.g., combine harvester, tractor, etc.) is described herein as one example environment in which certain embodiments of pickup assemblies are implemented, it should be appreciated that other agricultural machines may utilize certain embodiments of a pickup assembly (or their sub-assemblies), such as round balers, self-propelled balers, and machines equipped to gather crop material such as biomass or other types of crop material, including crop material as harvested by non-baling machines. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Referring now to FIG. 1, shown is an example environment 10 in which certain embodiments of a pickup assembly may be employed. One having ordinary skill in the art should appreciate in the context of the present disclosure that the example environment 10 is merely illustrative, and that pickup assemblies as disclosed herein may be implemented in other environments. The example environment, depicted in FIG. 1 as a towed square baler 10, has a fore-and-aft extending baling chamber denoted generally by the numeral 12 within which bales of crop material are prepared. In the particular illustrated embodiment, baler 10 is an "extrusion" type baler in which the bale discharge orifice at the rear of the baler is generally smaller than upstream portions of the chamber such that the orifice restricts the freedom of movement of a previous bale and provides back pressure against which a reciprocating plunger (not shown) within the baling chamber 12 can act to compress charges of crop materials into the next bale. The dimensions of the discharge orifice and the squeeze pressure on the bales at the orifice are controlled by a compression mechanism broadly denoted by the reference numeral 14 in FIG. 1. Baler 10 is hitched to a towing vehicle (not shown) by a fore-and-aft tongue 16, and power for operating the various mechanisms of the baler is supplied by the towing vehicle, though not limited as such.

The baler 10 is an "in-line" type of baler wherein crop material (e.g., biomass) is picked up below and slightly ahead of baling chamber 12 and then loaded up into the bottom of chamber 12 in a straight line path of travel. A pickup assembly broadly denoted by the numeral 18 is positioned under the tongue 16 on the longitudinal axis of the machine, somewhat forwardly of the baling chamber 12. A charge forming duct 20 extends generally rearwardly and upwardly from a point just behind the pickup assembly 18 to an opening in the bottom of baling chamber 12. A plunger reciprocates within the baling chamber 12 in compression and retraction strokes across the opening at the bottom of the baling camber 12. When fully retracted, the plunger uncovers the opening, and when fully extended, the plunger completely covers and closes off the opening.

The duct 20 defines an internal passage through which crop material travels from pickup assembly 18 to the baling chamber 12 during operation of the baler 10. The front end of the duct 20 is open to present an inlet into the internal passage, and an outlet of the duct is defined by the opening into the baling chamber 12. A top wall of the duct 20 is defined by a series of laterally spaced apart straps that extend downwardly and forwardly from the baling chamber 12 and terminate in forwardmost upturned front ends generally above the inlet to the duct 20. The rear of pickup assembly 18 has a centrally disposed discharge opening defined in part by a transition pan, in fore-and-aft alignment with the inlet to the duct 20, as is known.

The pickup assembly 18 has a pair of ground wheels 22 (one shown) that support the pickup assembly 18 as the baler 10 advances along the ground. The pickup assembly 18 is mounted to the front chassis of the baler 10 for pivoting movement about an upwardly and rearwardly disposed transverse pivot axis. Flotation for the pickup assembly 18 may be provided by a number of different flotation mechanisms well-known in the art.

A relatively short, transversely channel-shaped chute (e.g., transition pan) projects rearwardly from the pickup assembly and is slidably received within the front end of the duct 20. The chute serves as a transition piece between the pickup assembly 18 and the duct 20 for crop flow as the pickup assembly 18 rises and falls over uneven terrain relative to the duct 20 during operation.

The baler 10 may further comprise a feeding mechanism for moving crop materials through the duct 20. Such feeding mechanism may, for example, comprise a suitable rotor (e.g., rotating mechanism) associated with a cutter mechanism, or it may comprise other apparatus. For instance, the feeding mechanism may include a packer and a stuffer as is conventional and well understood by those skilled in the art. The packer is used to receive materials from the pickup assembly 18 and pack the same into the duct 20 for preparing a pre-compressed, preshaped charge of crop materials that conforms generally to the interior dimensions of the duct 20. The stuffer, as is conventional and well understood by those skilled in the art, functions to sweep (e.g., through its own kidney shaped path of travel) the prepared charge up into baling chamber 12 between compression strokes of the plunger when the opening at the floor of the baling chamber 12 is uncovered.

Figure 2:
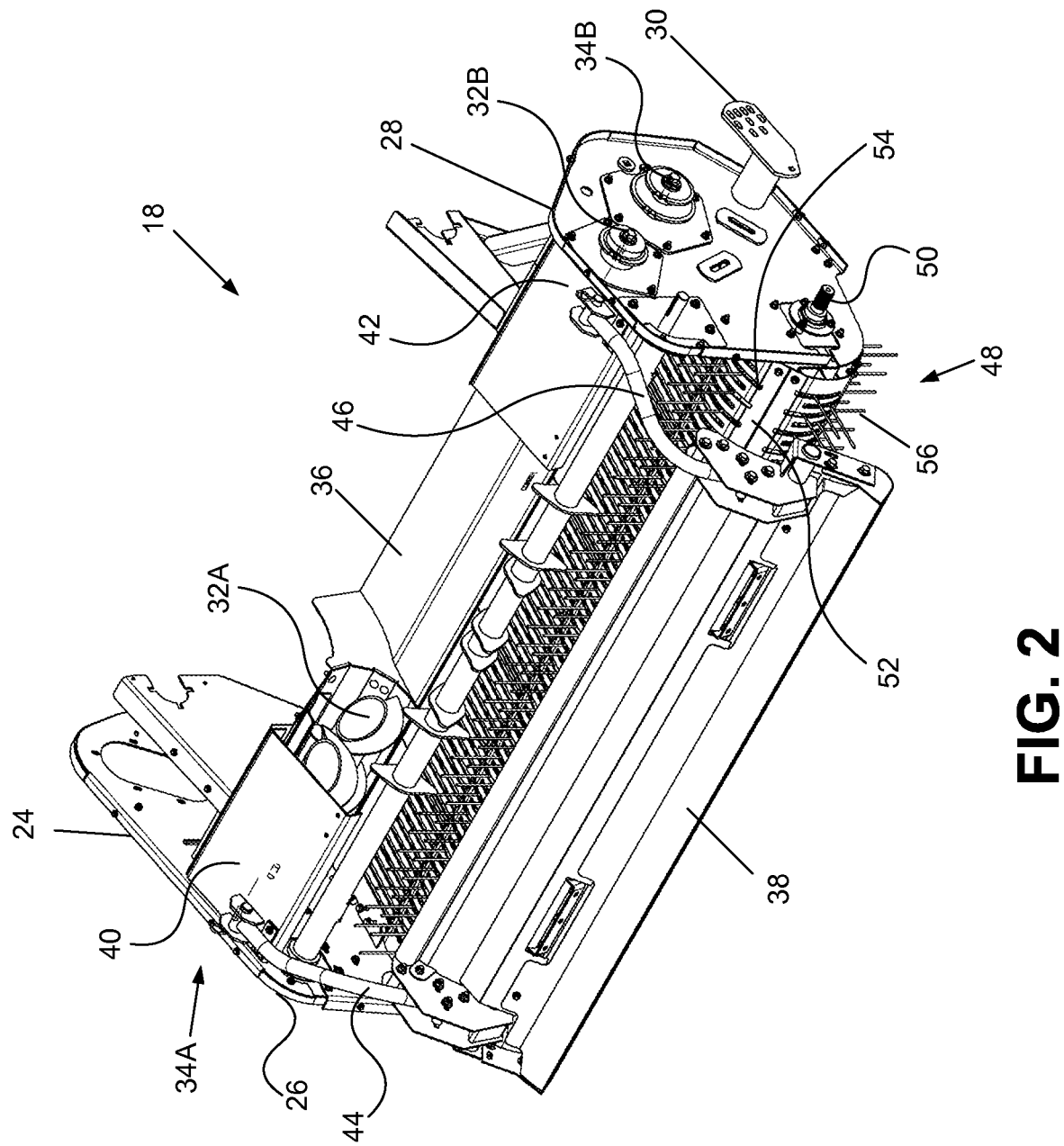
FIG. 2 is a perspective view of an embodiment of a pickup assembly.
Figure 3:
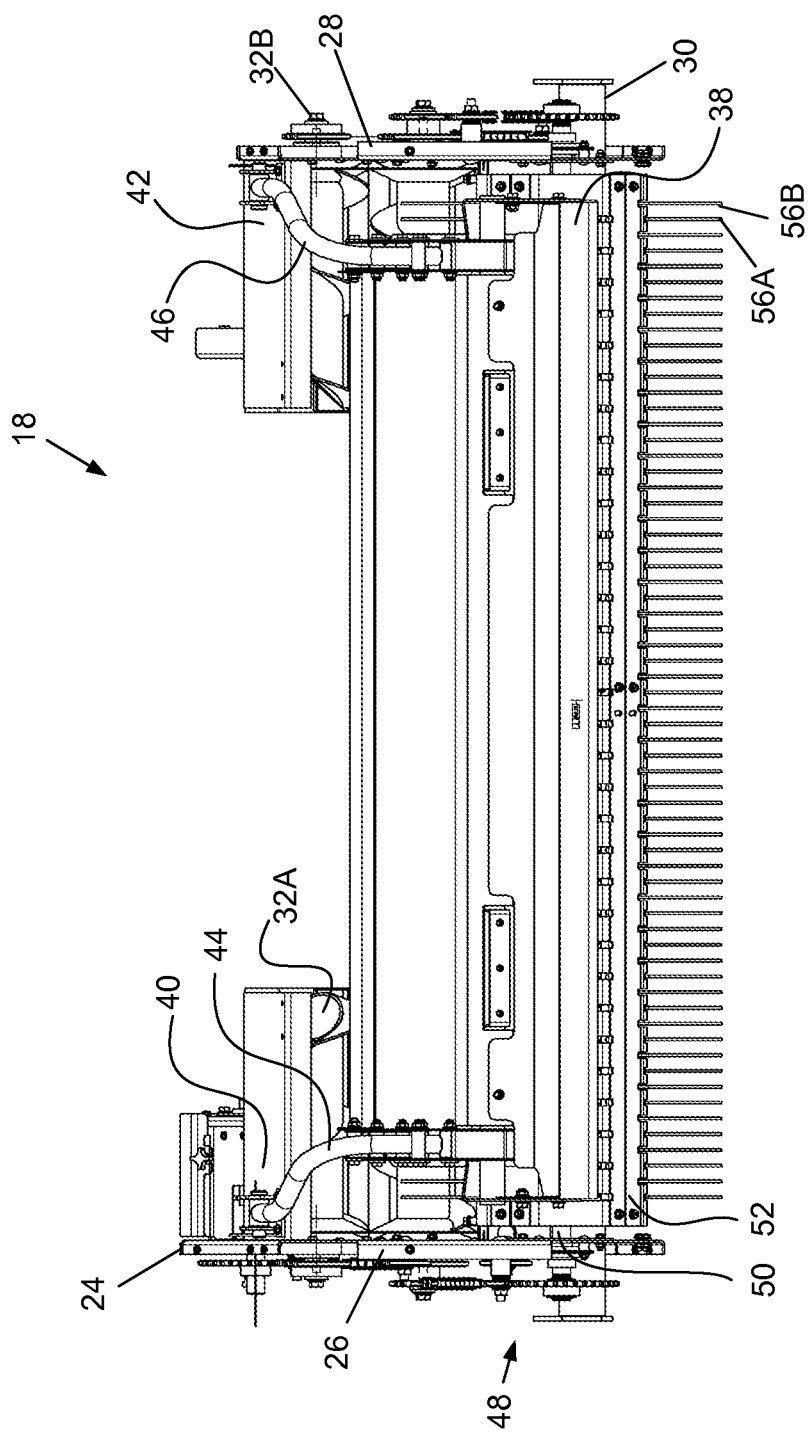
FIG. 3 is a front end elevation view of an embodiment of a pickup assembly.

Having generally described an example baler 10 upon which a pickup assembly 18 is mounted, attention is directed to the example pickup assembly 18 as shown in FIGS. 2 and 3. One having ordinary skill in the art should appreciate in the context of the present disclosure that the pickup assembly 18 depicted in FIGS. 2 and 3 is merely illustrative, and that other variations with the same or different features may be employed in some embodiments. The pickup assembly 18 comprises a main frame 24 that is mountable on the front of the baler 10 (as shown in FIG. 1). The main frame 24 comprises two opposing end members 26, 28 (e.g., flanges) and a backbone tube 30 coupled to the end members 26, 28. The end members 26, 28 and the backbone tube 30 provide structural support for the pickup assembly 18.

The pickup assembly 18 further comprises two pairs of stub augers 32 (e.g., 32A, 32B), 34 (34A, 34B), obscured mostly from view except for a partial cutaway of auger 32A and the end of their respective shafts. For instance, two sets of upper and lower consolidating stub augers 32, 34, are provided on opposite sides. A left set of stub augers comprises a lower stub auger 34B and an upper stub auger 32B. Similarly, a right set of stub augers comprises a lower stub auger 34A and an upper stub auger 32A. All four of the stub augers 32, 34 are cantilever-mounted, supported at their respective end members 26, 28 and unsupported at their inboard ends. The inboard ends of left stub augers 32B, 34B are laterally spaced from the inboard ends of right stub augers 32A, 34B so as to define an open space therebetween defining in part a transition pan 36 (shown in FIG. 2), which serves as a consolidated crop delivery zone. The augers 32, 34 each comprise a shaft that extends beyond the end members 26, 28 to engage a drive mechanism (better shown by the chain and sprocket arrangements depicted in FIG. 3). Such drive mechanisms are well-known, and may include a chain or belt coupled to the ends of the auger shafts and driven by the power take off (PTO) of the towing vehicle, a hydraulic motor residing on the baler 10, a gear box, among other mechanisms of drive power. As indicated above, the augers 32, 34 convey crop laterally and toward the center of the pickup assembly 18 to the transition pan (also referred to as a chute) 36. The transition pan 36 provides a path for the movement of gathered crop toward the inlet of the duct 20 (FIG. 1).

The pickup assembly 18 further comprises a wind guard 38 disposed toward the front of the pickup assembly 18. The wind guard 38 is pivotably connected to opposing ends of the main frame 24 at top portions 40, 42 via pivot arms 44, 46. The wind guard 38 prevents the picked-up crop material from projecting out and away from the pickup assembly 18. The wind guard 38 ebbs and flows with the gathering of the crop material as the baler 10 advances, facilitating a smooth matte of crop flow toward the internal working mechanisms of the baler 10.

The pickup assembly 18 also comprises a reel assembly, shown partially and denoted with reference numeral 48. The reel assembly 48 comprises a shaft 50 that extends through end members 26, 28, and is configured proximally to each of (or to one in some embodiments) end members 26, 28 to be coupled to a respective chain or belt (as better shown by the chain and sprocket mechanisms in FIG. 3) that is hydraulically or mechanically driven (e.g., via hydraulic motor, PTO, etc.). As shown, the reel assembly 48 comprises a reel cover 52 (shown in part) that encircles the shaft 50 and comprises plural slots, such as slot 54. Through each slot 54 extends a tine 56 of a tine pair, with immediately adjacent slots comprising tines from an offset tine row. For instance, as better illustrated in FIG. 3, tine 56A of a give tine pair disposed in a first row of tines extends beyond the reel cover surface and in the same orientation as tine 56B of a second row of tines, each of the tines 56A, 56B extending (past the reel cover surface) to approximately the same distance from the ground (e.g., when oriented toward the ground at a given instance of time). The tine 56B, shown oriented downward, is closer to the front of the pickup assembly 18 than the tine 56A (also oriented in the same direction—downward). In contrast, conventional reel assemblies have a wrapper in gaps between tines, resulting in a larger gap between tines than the tines 56A, 56B of the disclosed embodiment.

The reel assembly 48 is driven to cause the tines 56 to sweep upwardly and rearwardly over the top portion of the reel cover 52 toward the transition pan 36. Although described and shown as operating in a camless fashion (e.g., wherein the tines 56 do not retract as the reel assembly 48 rotates the tines toward the back), in some embodiments, operation may be according to a cam mechanism where the tines may retract and hence fall beneath the top surface of the reel cover 52 when the tines 56 are rotated toward the rear of the reel assembly 48. Such operation may serve to shed or strip the tines 56 of any crop material as the tines 56 retract from a respective slot 54.

Figure 4:
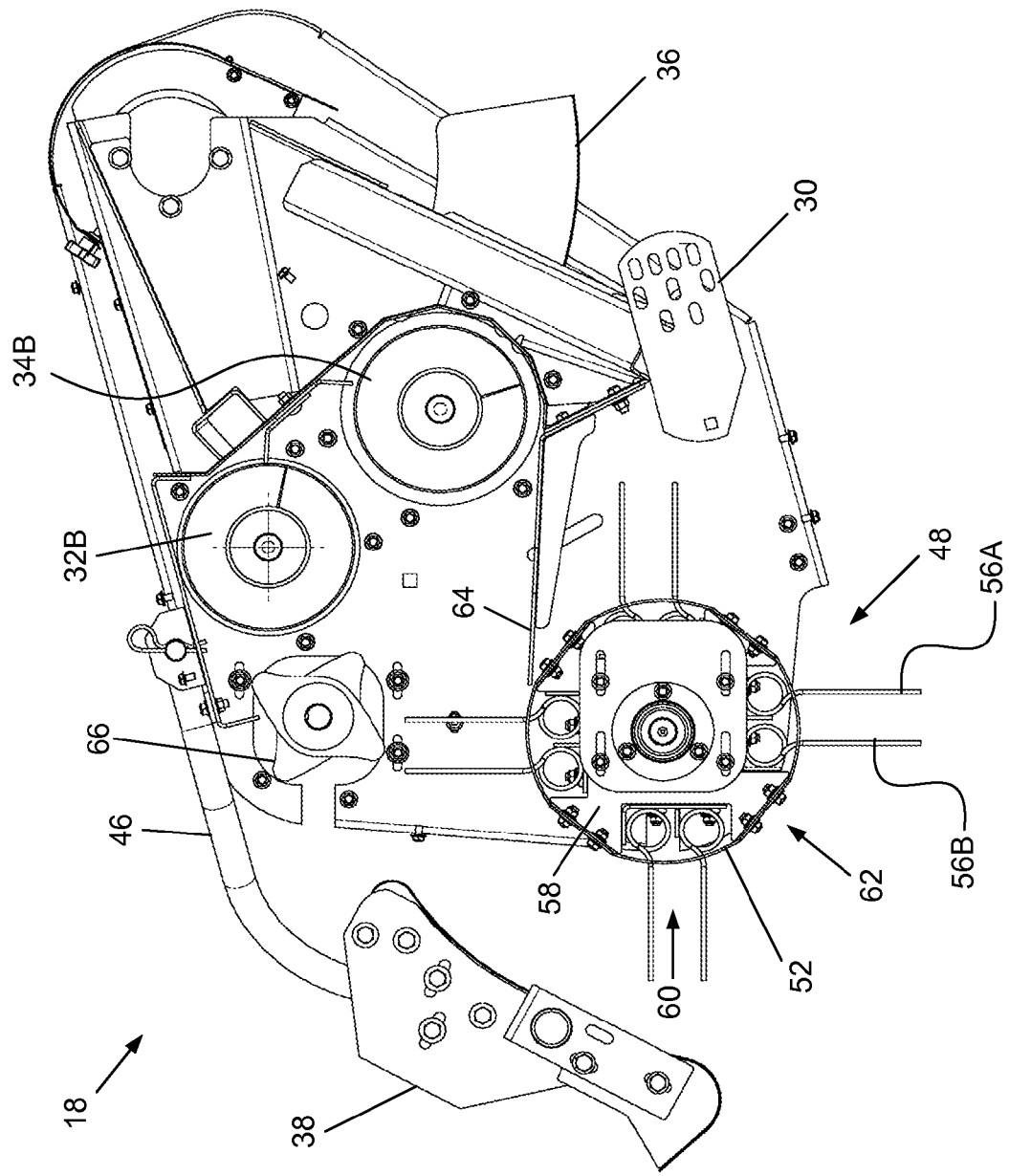
FIG. 4 is a schematic diagram in side elevation view of a cut-away of certain portions of an embodiment of a pickup assembly.

Referring now to FIG. 4, shown is a schematic diagram of a (left) side elevation view of the pickup assembly 18, with certain features shown and certain known, conventional features omitted. One having ordinary skill in the art should appreciate in the context of the present disclosure that the pickup assembly 18 depicted in FIG. 4 is merely illustrative, and that other variations with the same or different features may be employed in some embodiments. Known features described above and depicted in FIG. 4 include the wind guard 38 and associated pivot arms (e.g., pivot arm 46 shown), the ends of stub augers 32B and 34B, transition pan 36, and the end of backbone tube 30. Also depicted is an embodiment of the reel assembly 48. The reel assembly 48 includes the shaft 50 and a bulkhead 58 through which the shaft runs (e.g., through the center of the bulkhead). In some embodiments, the shaft 50 may run only partially through the bulkhead 58, such as when multiple shafts are employed in place of the single shaft 50. The bulkhead 58 is coupled to, and rotates coincident with, the shaft 50. The bulkhead 58 comprises plural tine occupying areas, such as denoted by reference numeral 60, and plural non-tine occupying areas, such as denoted by reference numeral 62. The non-tine occupying areas 62 are also referred to herein as reel cover attachment areas, as explained further below. The areas 60 and 62 radially alternate with one another. For instance, using an analogy of a clock face, the reel assembly 48 (at a given instant in time, such as shown in FIG. 4) may have the tine occupying areas 60 positioned at the 12:00, 3:00, 6:00, and 9:00 positions, and the non-tine occupying areas 62 positioned at the 1-2:00, 4-5:00, 7-8:00, and 10-11:00 positions of the reel assembly 48 as depicted in FIG. 4. Other quantities of areas 60 and 62 are contemplated to be within the scope of the disclosure.

Two pairs of tine rows, offset from each other, extend from the tine occupying areas 60. For instance, the tine 56B of a first row of tines extends from the tine occupying area 60 located at the 6:00 position in FIG. 4, and the tine 56A (located farther from the front of the pickup assembly 18 than the tine 56B when in the downward orientation) of a second row of tines also extends from the same tine occupying area and in the same orientation (downward). Another set of tine rows is located at the 3:00 position of the reel assembly 48 (and the 9:00 position of the reel assembly 48) at the depicted moment or instant of time, as well as the 12:00 position. Note that in one embodiment, each tine 56 shown in end view is part of a tine pair within a given row (as further illustrated in FIG. 6), though in some embodiments, the tine pair may be broken down into separate tines and hence separately affixed. As indicated above, since different quantities of tine occupying 60 and non-tine occupying areas 62 may be used in some embodiments, plural double-stacked rows of tines 56 may be located at clock positions other than quarterly (e.g., 12:00, 3:00, etc.). For instance, in some embodiments, instead of four rows of double-stacked tines as depicted in FIG. 4, additional rows of double-stacked tines 56 may be implemented (e.g., 3, 5, 6, etc.). Each row of double-stacked tines 56 is angled relative to another row of double stacked tines (e.g., orthogonally for four rows of double stacked tines, an angle between 0 and 90 degrees for more than four rows, an angle greater than 90 degrees for fewer than four rows).

Also illustrated in FIG. 4 is the reel cover 52, which encircles the shaft 50 and bulkhead 58. The reel cover 52 is depicted as a single sheet of metal, though in some embodiments, multiple sheets of metal may be used to serve the function of the reel cover 52. The tines 56 extend from the tine occupying areas 60 through the respective slots 54 (FIG. 2) in the reel cover 52. Hence, the reel cover 52 covers at least a portion of each of the tines 56. For instance, the tines 56 comprise a coiled spring in one embodiment, with at least the coil portion disposed beneath the reel cover 52. In one embodiment, the reel cover 52 is affixed (e.g., bolted, screwed, etc.) to each of the non-tine occupying areas 62 of the bulkhead 58. In some embodiments, each of the slots 54 (or in some embodiment, less than all of the plural slots 54) may be configured to enable more than a single tine 56 to pass through it. The reel cover 52 serves to facilitate the flow of crop material from the tines 56 to the transition pan 36, while mitigating the deposit of crop material into the machinery of the reel assembly 48.

Crop material that is gathered from the ground by the tines 56 (moving coincident with the shaft 50 and bulkhead 52 in a clockwise direction) are routed over the top surface of the reel cover 52 and to a platform 64, which serves to enable the flow of the crop material to the transition pan 36.

The pickup assembly 18 depicted in FIG. 4 is shown with various features, with the understanding that other arrangements are contemplated to be within the scope of the disclosure. For instance, the pickup assembly 18 is shown with a rotating mechanism 66 (e.g., moving in a counter-clockwise rotation) that assists the flow of the crop material toward the transition pan 36. In some embodiments, the rotating mechanism may be oriented closer to the reel assembly 48 in intermeshing cooperation with the tines 56, or in some embodiments, omitted.

Figure 5:
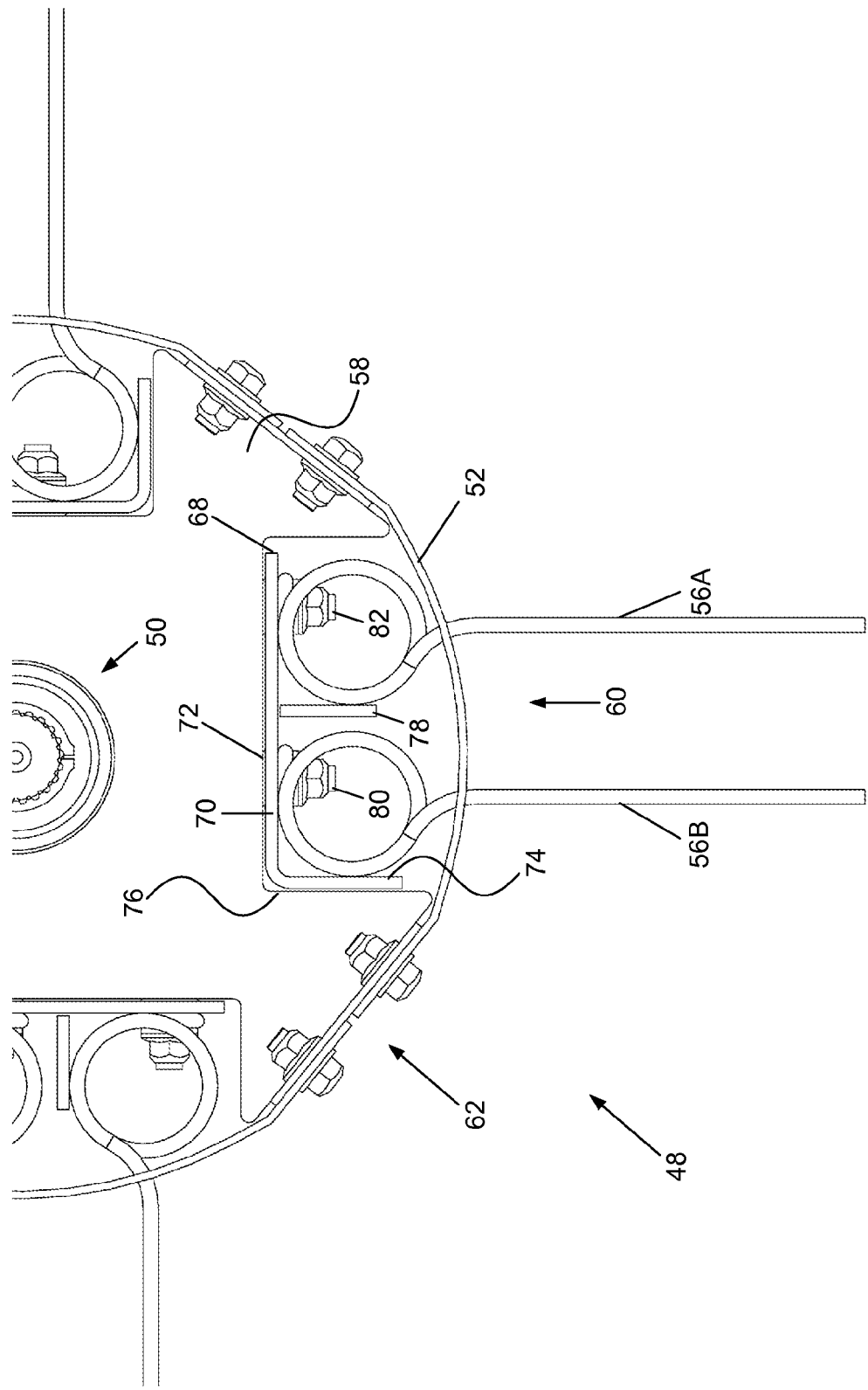
FIG. 5 is a partial side elevation view of an embodiment of a reel assembly with a reel cover.

Having described an example embodiment of a pickup assembly 18, attention is directed to FIG. 5, which shows a schematic in partial end view of the reel assembly 48 with the reel cover 52. One having ordinary skill in the art should appreciate in the context of the present disclosure that the reel assembly 48 depicted in FIG. 5 is merely illustrative, and that other variations with the same or different features may be employed in some embodiments. For instance, though shown with coiled tines 56 (of a pair), other types of tines with different mechanisms for attachment may be used, including those using a non-metal material and/or snapped onto a molded assembly, among other variations. In some embodiments, the reel cover 52 may be omitted. In the embodiment depicted in FIG. 5, the bulkhead 58 with the shaft 50 is shown, along with the offset tines 56A, 56B (with the understanding that tines 56A and 56B are the first of a pair in a respective row of tines). The bulkhead 58 comprises the tine occupying area 60 and the non-tine occupying area 62 adjacent to the tine occupying area 60. Disposed adjacent the tine occupying area 60 is an intermediate member 68. In one embodiment, the intermediate member 68 is configured as a single piece (e.g., of metal, or other material in some embodiments).

For instance, the intermediate member 68 (which as is understood, extends between approximately the end members 26, 28, FIG. 2) may comprise a single angle iron (or other metal) having a long portion 70 adjacent and substantially (e.g., a majority of the length exactly) parallel to a first surface 72 of the tine occupying area 60 of the bulkhead 58, the angle iron further comprising a short portion 74 adjacent and substantially (e.g., a majority of the length exactly) parallel to a second surface 76 (orthogonal to the first surface 72) of the bulkhead 58. A middle portion 78 of the intermediate member 68 may be welded to approximately the middle of the long portion 70 and substantially parallel to the short portion 74. The short portion 74, middle portion 78, and non-short portion end of the long portion 70 may serve as boundaries for the coils of the tines 56A, 56B. For instance, the tine 56B is located approximately midway on the long portion 70 that lies between the short portion 74 and the middle portion 78, whereas the tine 56A is located approximately midway on the long portion 70 that lies between the middle portion 78 and the non-short portion end of the long portion 70. In one embodiment, the tines 56A, 56B are affixed at the respective coil to the long portion 70 midway between the aforementioned boundaries. The tines 56A, 56B (e.g., of their respective pair of tines) may be affixed via a bolt assembly, such as bolt assemblies 80 and 82. The ends of the bolt assemblies 80 and 82 proximal to the bulkhead 58 may rest in respective groves (not shown) n the first surface 72, or in some embodiments, flush to the first surface 72. In some embodiments, the tines 56A, 56B may be affixed (e.g., clipped) to clipping mechanisms in the intermediate member 68, and hence the bolt assemblies 80 and 82 may be omitted. In some embodiments, the bolt assemblies 80, 82 (or in some embodiments, other affixing mechanisms such as a screw) may extend through the intermediate member 68 and anchored into the bulkhead 68. In some embodiments, the tines 56A, 56B may be comprised (all or in part) of a non-metal material, with or without a coil portion while still enabling deflection of each of the tines 56A, 56B.

In some embodiments, the intermediate member 68 may comprise a molded, single piece construction (e.g., without the need for welds), and in some embodiments, one or more of the portions may be omitted (e.g., middle portion 78 and/or short portion 74). In some embodiments, additional material layers may be introduced in the tine occupying areas 60.

In some embodiments, the intermediate member 68 may comprise multiple and independent pieces. For instance, a first piece (e.g., channel or slat) may be formed by a single piece construction encompassing the short portion 74, the middle portion 78, and portion of the long portion 72 joining the short 74 and middle portions 78. In some embodiments, the short portion 74 may be omitted. The first piece may be of molded or welded construction. The tine 56B may be centered in the first piece and affixed to the long portion 70 as similarly shown and/or described above in association with FIG. 5. A second, independent piece (e.g., channel or slat) adjacent (e.g., abutted against) to the first piece may encompass the middle portion 78 and the portion of the long portion 72 extending from the middle portion 78 to the non-short portion end of the long portion 72. The tine 56A may likewise be centered in the second piece and affixed to the long portion 70.

The reel cover 52 is affixed (e.g., bolted, though not limited to bolting mechanisms) to each of the non-tine occupying areas 62.

Directing attention now to FIG. 6, shown is an overhead, perspective view of the intermediate member 68. The intermediate member 68 comprises (viewed from the top of the page in landscape view and proceeding downward) the short portion 74, the long portion 70, the middle portion 78, followed by the balance of the long portion 70. The intermediate member 68 further comprises a first row of tines that includes tine pairs 56A-1 and 56A-2 (e.g., previously referenced as tine 56A among others shown at least in part) and a second row of tines that includes, among others shown, tine pairs 56B-1 and 56B-2 (e.g., previously referenced as tine 56B). The first row of tines 56A are offset from the second row of tines 56B by an offset "D", shown illustrative as a predefined distance between the bolt assemblies 80 and 82, though not limited to these reference points. In this manner, biomass (or other crop material) of smaller dimensions can be picked up more efficiently (compared to conventional pickup assemblies with a single row of tines) since there are more tines gathering the biomass in the reel assembly 48, filling gaps previously met with wrappers. For instance, what would conventionally be a gap between tines (e.g., occupied by a wrapper) is now filled by an offset tine 56 in certain embodiments of the pickup apparatus 18.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. For instance, though the reel cover 52 is described in association with the offset tine arrangement, the reel cover 52 may be employed for embodiments that do not utilize the offset (double stacked) tine arrangements (e.g., use a single tine row per clock-position of the reel assembly). Likewise, the double stacked tine arrangement may omit the reel cover 52 in certain embodiments. All such modifications and variations are intended to be included herein within the scope of this disclosure and protected by the following claims.

The invention claimed is:

1. A pickup assembly for an agricultural baler comprising:
   a main frame mountable on front of an agricultural baler, the main frame comprising two end members coupled to opposing ends of a reel assembly, the reel assembly comprising:
   a rotatable shaft;
   a bulkhead rotatable with the shaft, the bulkhead defining plural tine occupying areas and plural reel cover attachment areas in alternating succession around the periphery of the rotatable shaft;
   plural double-stacked tine rows, with one of said plural double-stacked tine rows in each tine occupying area such that each of the double-stacked tine rows is flanked by reel cover attachment areas, said double-stacked tine rows comprising a plurality of spaced apart tines, each tine comprising a coil portion, a tine fixing mechanism and a pair of radially extending portions for engaging crop material to be baled, wherein each double-stacked tine row comprises a first row of tines and a second row of tines having tines offset from tines in said first row such that adjacent tines in the first and second rows are offset in both a direction around the circumference of the rotatable shaft and also in a transverse direction along the shaft such that one of the radially extending portions of the tine in the first row is transversly positioned between the two radially extending portions of the adjacent tine in the second row; and a reel cover coupled to the plural reel cover attachment areas, the reel cover comprising a plurality of slots through which radially extending portions of the tines of the plural double-stacked tine rows extend.

2. The pickup assembly of claim 1, wherein the radially extending portion of each of the tines either remains extended through its corresponding slot throughout complete rotation of the bulkhead or is extended through the slot for less than a complete rotation.

3. The pickup assembly of claim 1, wherein the reel cover comprises a single sheet of metal.

4. The pickup assembly of claim 1, further comprising one or more intermediate members coupled to the bulkhead and adjacent to each of the plural tine occupying areas, wherein the reel cover is affixed to the plural reel cover attachment areas and the plural double-stacked tine rows are positioned at the plural tine occupying areas along the one or more intermediate members.

5. An agricultural baling machine comprising:
a pickup assembly having a main frame mountable on front of the agricultural baling machine, the main frame comprising two end members; and
a reel assembly coupled at opposing ends to the pickup assembly, the reel assembly comprising:
a rotatable bulkhead having a shaft running therethrough;
plural double-stacked tine rows rotatable with the bulkhead, with each of said plural double-stacked tine rows flanked by reel cover attachment areas, said double-stacked tine rows comprising a plurality of spaced apart tines, each tine comprising a coil portion, a tine fixing mechanism and a pair of radially extending portions pointing outward from the shaft so as to engage crop material to be baled by the baling machine, wherein each double-stacked tine row comprises a first row of tines and a second row of tines offset from tines in said first row such that adjacent tines in the first and second rows are offset in both a direction around the circumference of the shaft and also in a transverse direction along the shaft such that one of the radially extending portions of the tine in the first row is transversly positioned between the two radially extending portions of the adjacent tine in the second row; and
a reel cover coupled to the bulkhead and comprising plural slots through which radially extending portions of the tines extend.

6. The agricultural baling machine of claim 5, wherein the tines remain extended through the plural slots throughout either a complete rotation of the bulkhead or through a partial rotation.

7. The agricultural baling machine of claim 5, wherein the agricultural baling machine is either self-propelled or towed by another vehicle.

\* \* \* \* \*